Jan. 4, 1944.  N. WILKINSON  2,338,154

FLUID-COOLED DYNAMO-ELECTRIC MACHINE

Filed Jan. 16, 1939  4 Sheets-Sheet 1

Inventor
N. Wilkinson
by G. J. DeWein
Attorney

Jan. 4, 1944.  N. WILKINSON  2,338,154
FLUID-COOLED DYNAMO-ELECTRIC MACHINE
Filed Jan. 16, 1939  4 Sheets-Sheet 2

Inventor
N. Wilkinson
by G. J. ...
Attorney

Patented Jan. 4, 1944

2,338,154

UNITED STATES PATENT OFFICE 2,338,154

FLUID-COOLED DYNAMOELECTRIC MACHINE

Nathan Wilkinson, Wauwatosa, Wis., assignor to Allis-Chalmers Manufacturing Company, Milwaukee, Wis., a corporation of Delaware Application January 16, 1939, Serial No. 251,070

24 Claims. (Cl. 171—252)

This invention relates to or is adapted for utilization in connection with electrical apparatus, especially dynamo-electric machines of the fluid-cooled type wherein efficient cooling and minimum weight or space-occupying requirements of the machine and its cooling accessories, and accessibility for inspection and repair, are substantial considerations.

In many situations, limited space is available for location and installation of fluid-cooled apparatus, such as dynamo-electric machines, and the operating accessories required for maintaining the machine in a satisfactorily cool operating condition, and for such disassembling and assembling operations as may be required in the maintenance of the machine and its accessories; and hence it is important that the space occupied by such machines and their accessories be a minimum. Likewise, under certain conditions, it is important, particularly in the case of direct current dynamo-electric machines, that the machine, while readily accessible for maintenance purposes, be wholly enclosed in the interest of minimizing fire hazard and deterioration due to the effect of surrounding atmosphere laden with dust or harmful vapors, such as salt laden air, as in the case of machines installed on ships.

The present invention contemplates among its features, singly or collectively, the provision of an enclosed dynamo-electric machine especially adapted to accommodate for various hereinabove described requirements as to desired cool operation under various load conditions, minimum space-occupying requirements of the machine and its operating accessories, and maximum facility for permitting ready access to various parts of the machine and its accessories for inspection, cleaning, and ready assembling and disassembling; the association with the machine of a fluid cooling arrangement surrounding the frame of the machine so as to constitute a unitary assembly therewith wherein the machine proper may be carried by the cooling accessory in a manner permitting ready inspection, repair, and disassembling of the machine; the utilization of a series of tubular elements through which is passed cooling fluid, such as water, the cooling elements being arranged in such desirable heat-transferring association with the heated parts of the machine, or the heated air enclosed therein, as to provide for ready absorption of heat from the machine, without permitting appreciable transfer of heat between the machine and the atmosphere of the space in which the machine is located; the disposal of the fluid cooling elements with respect to the machine so as to be readily accessible for cleaning, removal and replacement and to insure that leakage of cooling fluid from the cooling elements cannot pass to an interior portion of the machine; and the provision of specific forms of elements and devices adapted to secure the hereinabove and other desirable features and advantages in an enclosed fluid-cooled machine.

It is an object of this invention to provide a fluid-cooled apparatus of improved design and construction.

It is a further object of this invention to provide an improved design and construction of enclosed and ventilated dynamo-electric machine in such association with a fluid cooling device for absorbing heat from the dynamo-electric machine as to insure efficient cooling and at the same time minimum space-occupying requirements of the assembly.

It is a further object of this invention to provide an improved design and construction of enclosed fluid-cooled dynamo-electric machine, utilizing a fluid cooling device surrounding and separable from the conventional stator element of the machine and capable of being utilized as a support therefor.

It is a further object of this invention to provide an improved design and construction of enclosed dynamo-electric machine and cooling device associated therewith providing for absorption of heat generated in the machine and utilizing a fluid cooling medium passing through conduits which are separated at all points by a fluid impervious wall from the space in which the dynamo-electric machine proper is disposed.

It is a further object of this invention to provide an improved design and construction of cooling device of utility in cooling dynamo-electric machines, wherein a plurality of fluid carrying tubes are utilized and are so mounted and arranged with respect to the machine, as to be separated by a fluid impervious medium from all active elements of the machine and to be capable of cleaning, removal and replacement without disassembling of the machine itself.

Further objects of this invention include an improved design and construction of a fluid cooling device for or of utility in association with an enclosed dynamo-electric machine, and capable of affording a unitary assembly of the machine and cooling device, and wherein leakage from the fluid containing elements of the cooling device cannot pass into the machine and is observable from an external point, and leaky or defective portions of the cooling system may be blocked off from the remainder of the cooling system without removing the machine from service.

Other objects and advantages of this invention and various novel features thereof will be apparent from the following description and the accompanying drawings, disclosing embodiments of features of the invention, and will be more particularly pointed out in the claims.

In the embodiment of the invention illustrated in Figs. 1 to 5, wherein features of the invention are applied to a dynamo-electric machine, the machine being considered as either a generator or motor of the direct current type, 5 designates the rotor of the machine, such rotor or armature element being of generally conventional design. As indicated, the armature comprises an annular laminated core structure 6 carried by a spider construction 7 which is keyed on the shaft 8, the latter being rotatably mounted as hereinafter described, and a commutator 9 separately mounted and keyed on the shaft 8, with the bars of the commutator suitably connected to the armature winding 10 disposed in peripheral slots of the core 6. Current-collecting brushes 12 cooperate with the commutator, and conventional provisions suitably mounting the brushes in brush holders, with a preferably angularly adjustable support 13 therefor, are made for leading current to and from the brushes.

A field or stator element, preferably in the form of a yoke of rolled steel, in the interest of minimum weight, with field poles attached to the yoke, is arranged about and in concentric relation with the rotor 5, so as to provide a desired uniform air gap between polar portions of the stator and the armature, the embodiment illustrated including a yoke 15 provided with spaced poles 16 projecting inwardly therefrom and provided with energizing windings 17 suitably interconnected between poles and provided with terminal leads. The brush holder support 13 may be in the form of a ring supported in position on an axially extending portion 19 of the field yoke 15.

Figures 5, 6, 7, 8:
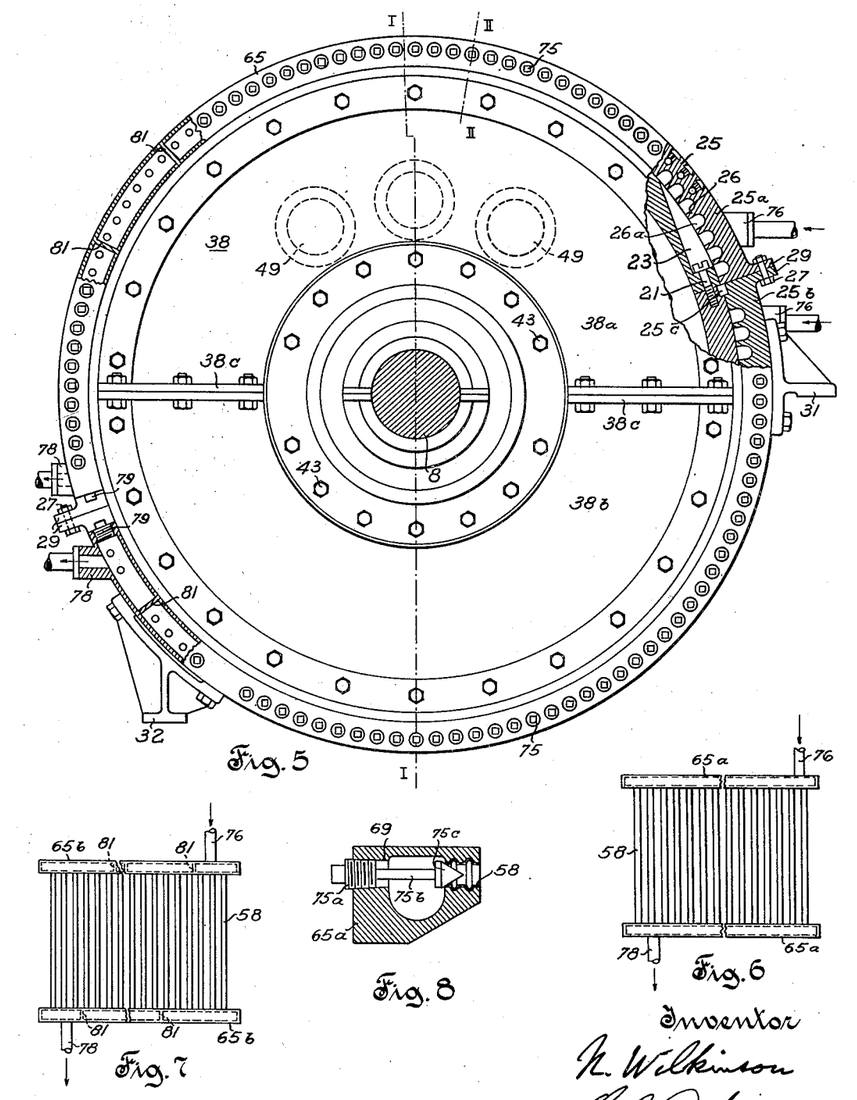
Fig. 5 is an end view of the machine shown in Fig. 1, with parts broken away.
Fig. 6 is a diagrammatic view of a path of fluid flow through a form of cooling system with which the machine of Figs. 1 and 5 may be provided.
Fig. 7 is a view similar to Fig. 6, showing a modified flow arrangement for the cooling system.
Fig. 8 is a broken sectional view, in the plane of section of Fig. 2, showing a feature concerned with the maintenance of the machine.

As indicated, the field yoke is formed in two sections, 15a and 15b, the plane of division being horizontal or, as shown in Fig. 5, at an angle to the horizontal, the sections being held together by securing bolts 21, countersunk recesses 23 being provided in the adjacent external portions of the yoke sections to receive the heads of the securing bolts.

The yoke or field element of the machine is surrounded by an annular shell or cradle element 25 provided at its inner periphery with spaced ribs 26 which extend axially, or preferably at a slight inclination from a true axial direction. The annular element 25 is preferably of relatively light material of the required mechanical strength and good heat conducting properties, such as an aluminum alloy, and it is formed in a plurality of sections, here shown as two, designated as 25a and 25b, the plane of division being substantially coincident with the plane of division between the sections 15a, 15b of the field yoke. When in operative position with respect to the field yoke 15, the sections 25a and 25b are held together in operative relation by securing bolts 27 passing through external flanges 29. Rotation of the field yoke with respect to the shell 25 when the parts are in assembled condition is prevented by a key 25c removably seated in a recess formed in adjacent portions of the lower sections of the field yoke and the shell, at the dividing line between the upper and lower sections of the field yoke and shell.

The lower section 25b of the annular cradle-like element 25 is provided with pedestals or feet 31, 32 at any desired or convenient points depending on the character of the support or foundation, the feet being integral with or bolted to such lower sections and suitably formed to rest on supporting columns or other foundation properly disposed to best utilize the available space. By reason of the fact that the annular element 25 is supported in position through its lower section 25b, the upper section 25a may be readily removed from its position in engagement with the field yoke 15 and the upper half of the latter thus exposed, after removal of the bolts 27 which secure the flanges 29.

The radially inner periphery or edges of all or only certain spaced ones of the ribs 26 on the annular element 25 are machined to provide a fairly close engagement or positioning of such ribs with respect to the outer periphery of the field yoke 15. The ribs 26 are recessed at their inner edges to provide a seat for the field yoke 25, a shouldered portion 34 at the commutator end of the field yoke serving as an abutment for one end of the yoke, and shouldered portions 35 at the opposite end of the ribs cooperating to maintain the field yoke and the annular element 25 in desired cooperative relation.

The annular cradle element 25 is recessed to provide undercut external shoulders or abutments, indicated at 36, at its end portions adjacent the inner periphery thereof; and centrally apertured end heads or housings 38 are mounted in position through peripheral flange portions 39 thereon, secured in sealing arrangement to the radial faces of the shoulders 36 and in close proximity to the adjacent circumferential faces of the end portion of the cradle element, as by suitable bolts, passing through suitable spaced apertures in the flanges 39 and secured in threaded apertures in the annular element 25.

These end housing 38 are in a plurality of sections 38a, 38b, preferably divided along a substantially horizontal diameter, the opposing edges of the sections being provided with flanges 38c which are secured together in sealing arrangement by securing bolts, an arrangement which permits assembling and disassembling of the sections separately. A centrally located bearing housing 41, carrying therein an annular bearing element 42 in which the shaft 8 is rotatably mounted, is mounted in position within the central aperture of each end housing by bolts 43 passing through alined apertures in an external retaining ring 45 and an annular inner hub portion of the end housing 38 and secured in threaded apertures in a peripheral flange 46 of the bearing housing. The inner and outer faces of the hub portion of the end housing are machined, as are likewise the inner face of the retaining ring 45 and the outer face of the flange 46, so that when the securing bolts 43 are drawn up tight, a sealing engagement is effected between the flange 46 of the bearing housing and the end head 38. The bearing housing may be divided along the horizontal diameter into two sections detachably held together by bolts, and, with such an arrangement, the upper half of the bearing housing may be removed from position along with, or after removal of, the upper section of the end housing.

A suitable sealing arrangement is provided between the rotatable shaft and the inner side of the bearing housings, for sealing against the passage of air outwardly from the enclosed machine and the passage of oil inwardly from the bearing housing to the interior of the machine. The outer end of the bearing housing at the left side of the machine is closed by a diaphragm 48 held in sealing arrangement with the end portions of the housing when the sections thereof are secured in position; and an additional closure for the shaft opening in the bearing may be provided in the form of a closure plate removably secured to end of the bearing housing. At the right side of the machine, where the shaft 8 passes outside the machine, suitable arrangements, generally similar to that used at the inner end of the bearing housing, may be utilized for sealing against leakage of air and oil.

Current is led to or from the terminals of the machine within the enclosure, through suitably insulated leads mounted in the end housing 38 and secured in sealing engagement therewith, line terminals outside the machine and the terminals within the machine being detachably connected with the respective ends of these insulated leads. These leads are preferably disposed sufficiently close to hand holes 49 in the end housing so that, when the covers 49a are removed from normal sealing arrangement with edges of the hand holes, the inner ends of the leads may be disconnected from the machine terminals, to thus permit removal of the end head, after disconnection of the line terminals from the outer ends of the leads. Additional openings, provided with sealed closures, may be provided for any desired purpose, such as mounting an exploring lamp on the inner side of the end housing, or providing for insertion of a tool for adjusting the brush holder ring, or the like; or the shank of such a tool may remain in position, protruding through an opening in the end housing, such opening being provided with a seal or packing which affords an air tight seal and still permits rotation of the tool shank. Instead of having the upper section 38a of the end housing in a single part, it may be in the form of two or more sections removably bolted together to permit removal of one section while leaving the other in position, as suggested by the split upper section 38a of Fig. 9.

The spaces, indicated at 26a, between the ribs 26 of the annular element 25 open at their ends into the spaces between the end housings 38 and the adjacent ends of the field poles of the machine, and hence heated air from the interior parts of the machine may circulate through these spaces 26a, in contact with the outer surface of the field yoke and the ribs 26 and the body of the annular shell 25. This air circulation is forced by a fan 51 carried by one end of the rotor, as by being mounted on an annular support 52 secured at its inner periphery to the support for the end turns of the armature winding, the vanes of the fan being preferably so formed and disposed with their inlet edges at a point radially beyond the air gap of the machine, as to draw heated air from the air gap, as well as the remainder of the space within the end heads, and discharge such air to the adjacent end of the spaces or ducts 26a, formed by the rims 26 and the adjacent portions of the field yoke and the annular shell 25. Resistance to the circulation of air through the passages 26a is decreased by rounding, as indicated at 53, those portions of the shell 25 corresponding to the end walls of the passages 26a between ribs 26, and by correspondingly curving the edge or end of the field yoke, as indicated at 54, adjacent the fan 51. The heated air drawn by the fan from the interior of the machine passes through the spaces or ducts 26a from one end to the other thereof, and, with the air passing in intimate heat transferring relation with the material of the ribs 26 and the body of the annular shell or cradle, heat is absorbed by these latter parts from the current of air and dissipated through the body of the annular shell.

With the arrangement described hereinabove, it will be apparent that the dynamo-electric machine proper is wholly enclosed within a supporting housing which protects the machine parts from any harmful effects of dust or vapor in the external atmosphere; and heat developed within the machine, during operation thereof, is carried, through the forced circulation of air, to and absorbed by the enclosing casing or shell from which it is dissipated.

Provision is made for greatly increasing the amount of heat absorbed from the circulating air in the enclosed machine, and dissipated through the enclosing shell 25, through the use of a conduit system within the body of the annular shell 25 through which cooling fluid may flow in relatively close proximity to the heated portions of the shell. As indicated in Figs. 1 to 5, the outer periphery of the enclosing shell 25 is provided with apertures or slots 57 extending longitudinally throughout the length of the shell and disposed substantially opposite the internal ribs 26, the inner portion of these slots being preferably of semi-circular cross section. The increased surface area provided by the side walls of these apertures or slots greatly increases the heat radiating or dissipating surface of the shell. This dissipation of heat from the material of the shell is effected in a generally confined manner, through the use of thin walled metal conduits 58 inserted in the apertures or slots 57 in the enclosing shell and disposed in intimate heat-absorbing engagement with the walls of these apertures, and through which conduits a cooling fluid is circulated to absorb heat from the conduit walls. The use of tubes 58 of thin brass tubing, or alloys such as are of recognized value for marine boiler tubes, is particularly advantageous from the standpoint of heat conductivity and also resistance against corrosion which might otherwise be particularly noticeable in using certain types of cooling fluid, such as salt water, in the tubes. However, tubes of material of lower corrosion-resisting qualities may be used; but under these circumstances, it is desirable to provide the tubes with an intimately united coating of metal which is more resistant to corrosion. While certain desirable results may be attained by passing cooling air, or other gas, through such a conduit system in the annular shell, still in the interest of insuring high heat absorbing and dissipating effects, with minimum weight and size of parts and high general economy, it is preferable to pass a cooling liquid, such as water, under pressure through the conduit system.

Each tube 58 may be held in desired position and against vibration in its slot by a pair of parallel filler pieces 59, preferably of bronze and spaced from each other to provide a longitudinal space 60 therebetween, and having extended contact, along a curved surface at the inner side thereof, with the correspondingly shaped surface of the tube, and the inner pointed edge of each filler piece 59 is preferably slightly chamfered to prevent scoring of the tube. The filler pieces are forced and held in engagement with the tube by suitable wedges 61, preferably of bronze, which are secured in dovetail recesses in the side walls of the slots 57 near the outer edges thereof. As the filler pieces are forced into operative position, the desired intimate engagement thereof with the tube and the side walls of the slot is attained.

Figure 3:
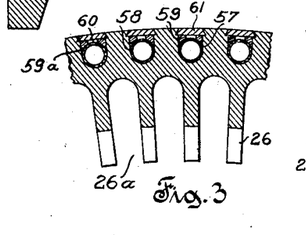
Fig. 3 is a fragmental vertical sectional view in the plane of the line III—III of Fig. 2.
Figure 4:
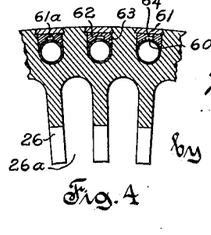
Fig. 4 is a view similar to Fig. 3, showing a modified form of a detail.

In Fig. 4, there is shown a modified form of filler or securing element 62, as a substitute for the pair of filler elements 59 of Fig. 3. The filler element 62 is in the form of a single piece and is of substantially the same general outline as the assembled pair of filler pieces 59 of Fig. 3, and comprises two inwardly projecting portions 63, spaced to provide a longitudinal recess 60a therebetween and having surfaces at their inner ends of the same curvature as the tube, and a relatively thin cross-piece 64 connecting the projections 63 at their outer ends. The reduced cross section of the cross-piece and the resilience thereof permit forcing of the projections 63 against the tube and the side walls of the slot, as the filler element is forced into and held in operative position by the wedge 61.

In a machine of any considerable size, the filler elements 59 of Fig. 3 and 62 of Fig. 4, in the interest of convenience in handling and assembling and disassembling, are preferably in the form of a plurality of abutting sections whose total length is equal to the length of the body of the shell 25. And the wedges 61 are preferably made in a plurality of sections each of which may readily be forced into operative position after being passed into an outer cut-away portion 61a of the slot walls, at an intermediate point in the length of the slot. This latter arrangement permits assembling the wedges in position without utilizing any space axially beyond the ends of the machine.

The header sections 65a, 65b may be of cast bronze; or they may be formed from a bar of steel bored and machined and bent to semicircular shape; and these header sections may be supported and maintained in operative position wholly through the connection of such sections with the tubes 58; and if desired, spacing separators, preferably of somewhat yieldable insulating material, may be inserted between radially inner sides of such header sections and the adjacent surface of the shoulders formed at the ends of the cradle or shell sections 25a, 25b. The ends of the central aperture or passage 68 in the header sections 65, 67 are closed by integral portions of the header section or by plugs 75 removably secured in the header sections.

A cooling conduit system is thus provided by the pair of upper header sections 65a and the tubes 58 connected with such header sections; and a second cooling conduit system is provided by the pair of lower header sections 65b and the tubes 58 connected thereto. Each of these conduit systems is provided with an inlet connection, indicated at 76, to the passage 68 of one of the header sections of the system, adjacent one end of such header section, and a discharge connection 78 from the other of the header sections of the system, adjacent the end of the latter header section which is remote from the inlet connection to the first header section of the system. Suitable cooling fluid, such as water, may be supplied to the inlet connections 76, under sufficient pressure to maintain flow at the desired rate through the header section with which the inlet connections are associated, and the other header section to which the tubes are connected at the opposite end of the machine, the cooling fluid discharging from the latter header section through discharge connection 78. As shown diagrammatically in Fig. 6, all of the tubes 58 may be connected to form parallel flow circuits between the two associated header sections.

Figure 1:
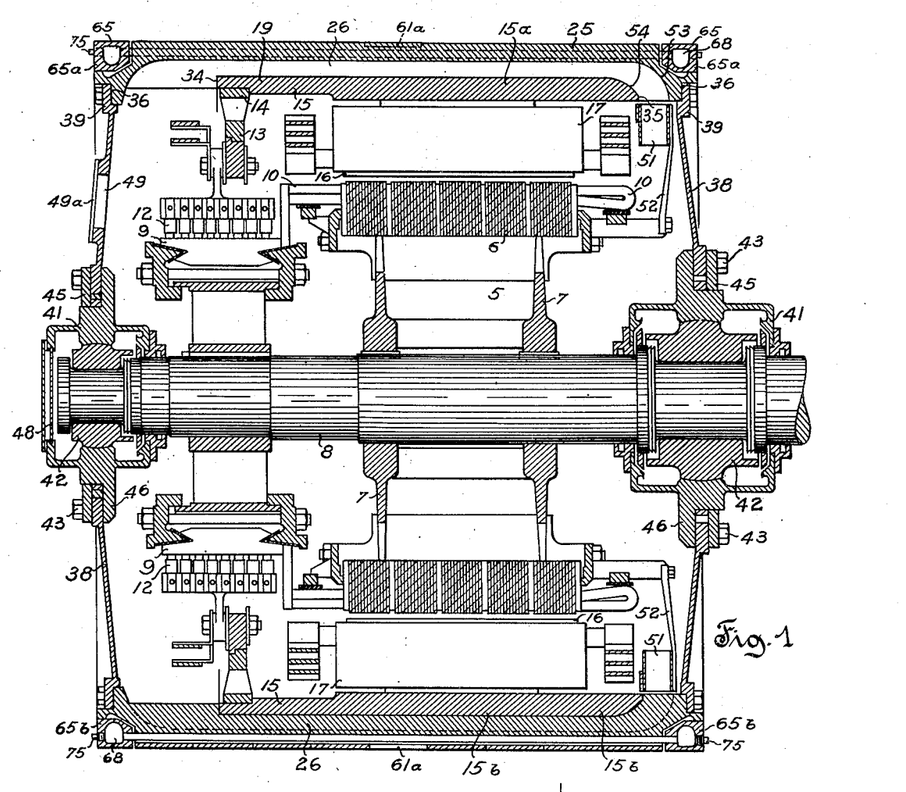
Fig. 1 is a vertical sectional view in the plane of line I—I of Fig. 5, of a fluid-cooled dynamo-electric machine embodying features of the present invention.

As indicated more particularly in Figs. 1 and 3, the tubes 58 extend beyond the ends of the body portion of the shell 25, and these extending end portions of the tube communicating with an annular or arc-shaped header 65 disposed in recessed portions at each end of the annular shell 25, substantially within the peripheral limits of the shell. Each header 65 is preferably in two, as more particularly indicated in Fig. 1 at 65a, 65b, or more sections for facility in assembling and disassembling purposes. As indicated, the upper section 65a of the header is associated with the upper shell section 25a, and the lower section 65b with the lower shell section 25b.

Each of the header sections 65a and 65b is provided with a substantially central aperture or passage 68 through its circumferential length, and a set of transverse and alined apertures 69, 71 in its side walls, each aperture opening into the central passage 68. The opening 69 is preferably slightly larger than the opening 71, and the latter is of such size that the tube 58 in normal and undistorted shape may readily pass through, without too close engagement with the walls of, such aperture. The ends of the tubes 58 extend into the apertures 71 preferably throughout substantially the full length of the latter apertures, and are secured in position therein, preferably by rolling the tube from the inside thereof into intimate fluid tight and mechanically secure engagement with the walls of the aperture, with portions of the wall of the tube rolled into one or more annular recesses 73 in the wall of the aperture. This connection may be supplemented to any desired extent by other means, such as solder. With the tubes secured in position in the apertures 71, the apertures 69 may be closed in a fluid tight manner by screw plugs 75.

The path through each cooling system from one header section, through the tubes 58, to the corresponding header section at the opposite side of the machine may be varied to a considerable extent, depending on the degree of cooling desired. As diagrammatically shown in Fig. 7, the conduit system may be one where the passages 68 in the several header sections are blocked at spaced points by partitions or barriers 81 closing the passages at these points, with the partitions 81 in one of header sections of each conduit system disposed in staggered relation with respect to the partitions 81 in the other section of such system, to provide a series-parallel arrangement of the tubes in the conduit system. In this latter arrangement, the cooling water passes from the inlet 76 into the adjacent portion of the passage 68, thence through the right hand group of three tubes, to the right hand portion of the passage 68 of the opposite header section, and thence returns, through the next adjacent group of three tubes to the passage 68 in the first header section; and the flow of cooling fluid continues from one to the other header section through groups of three tubes, the passage being defined by the positioning of the partitions 81, to the discharged connection 78. And the water, during its passage through the conduit system, absorbs heat from the shell 25 in which the tubes 58 are embedded in intimate heat-transferring relation.

The header sections 65a, 65b, with their associated tubes 58, may be assembled in position with respect to the corresponding cradle or shell sections 25a, 25b, before assembling the machine in position with the cradle. With the pairs of associated header sections held in desired definite position with respect to the cradle sections and the closure plugs 75 removed, and the apertures 69 and 71 of the header sections alined with the slots 57 in the cradle sections, by external means, the tubes 58 are inserted lengthwise through the alined apertures 69 and 71 in one header section and through the slots 57 in the cradle section, and thence into the corresponding aperture 71 in the opposite header section. By means of a suitable expanding tool, each tube, when inserted to desired position in the header sections, may be forced into and secured in intimate and fluid tight engagement with the adjacent walls of the apertures 71 of the two header sections, by rolling portions adjacent the ends of the tube into grooves in the wall of the apertures 71. With the tubes thus secured in the header sections and positioned in the slots 57 of the cradle section, the filler pieces 59 are inserted to position in the slots 57; and the sectional wedges 61 are slipped into position through the enlarged portion 61a of the open slots, and are forced longitudinally to their normal positions, thus crowding the filler pieces into and securing the same in intimate heat-transferring relation with the tubes 58 and the side walls of the slots.

The tubes 58 may be disposed originally in operative position with respect to the shell 25 and the header sections 65 by another method, of more particular utility when the machine and its cradle are assembled in operative position and limited space at the end of the machine will not readily permit insertion of the tubes 58 lengthwise from the end of the machine. In accordance with this alternative method, and with the header sections held in their proper position with respect to the cradle or shell, one end of a tube may be laid in its slot 57 and then, while the other end of the tube rides along the outer periphery of the adjacent header section, the tube is forced lengthwise through the slot 57 and into the aperture 71 of the other header section, and into the passage 68 thereof to a sufficient distance to permit the opposite end of the tube to pass fully into the slot 57, the flexibility of the thin walled tube readily permitting such distortion of the tube as may be necessary to permit assembling in this manner. The tube may then be forced back longitudinally until both ends thereof project to the desired extent into the apertures 71 of the header sections, and may then be secured in fluid tight relation with the walls of the apertures 71 and the filler pieces 59 or 62 and wedges 61 may then be inserted and secured in operation position, as described hereinabove.

The specific arrangement and relation of parts of the fluid cooling arrangement hereinabove described are of particular advantage in the matter of readily detecting leaks in the cooling conduit system. Any leakage through any tube 58 cannot pass to the interior of the machine, since all parts of the cooling conduit system are outside of, and separated by a fluid impervious wall from, the enclosed machine; and any such leakage will quickly be made apparent by reason of its passage through spaces between adjacent sections of the wedge 61, particularly where the same are purposely positioned to avoid close mutual engagement of the wedge section; and also, with the space 60, 60a present between the sections or parts of the filler pieces 59 or 62, leakage passes through this recess to the end of the shell 25 adjacent the header.

In case any tube should develop a leak in service, and it is not convenient to replace the leaky tube at the time, any such tube may be blocked off from the remainder of the conduit system by shutting off the supply of cooling fluid to the cooling system in question, removing the closure plug 75, corresponding to the leaky tube, in each of the opposed header sections and substituting for such plugs closure plugs 75a as shown in Fig. 8, of generally similar formation, but provided with an axial extension 75b on the inner end of which is formed a cone wedge or plug 75c which may be forced, by the action of the screw thread on the plug 75a, into fluid tight sealing relation with the adjacent end of the tube 58, to form a perfect closure therefor, thus eliminating such tube from active service in the cooling system. This operation requires very little time, and with the emergency plugs in operative position, the fluid cooling may be supplied again to the cooling system, all without the necessity of removing the machine from service.

When it is desired to remove and replace a tube 58, the tube may be sawed or otherwise cut through at the point where it passes through the spaces between the header sections and the adjacent ends of the annular cradle 25, this operation being performed either from the outside or, with the closure plug 75 removed from the inside of the tube, by a cutting tool inserted through the apertures 69 and 71. With the tube severed or separated from the header sections, the tube may be lifted out of its slot 57, after removal of the sectional wedge 61 and the filler pieces 59, 62. Any portion of the tube remaining in the aperture 71 of the header sections may be drilled or reamed out. A replacement tube may then be inserted and secured in position by either of the methods described hereinabove, depending upon the available space at the end of the machine.

Figures 9, 10, 13, 14, 15:
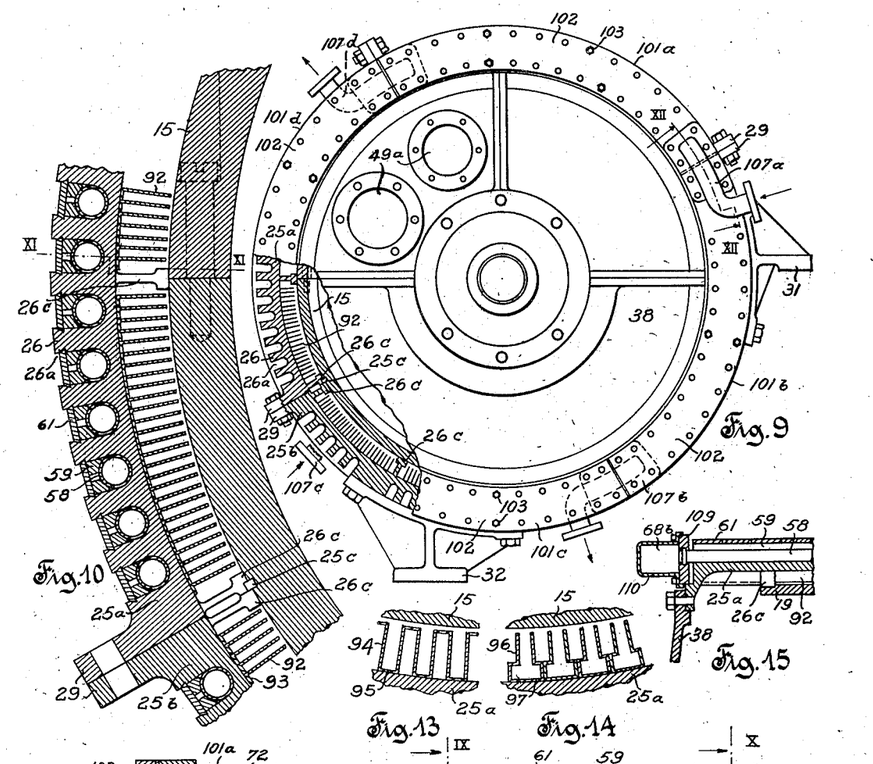
Fig. 9 is a view similar to Fig. 5, with parts broken away, showing modified forms of features of the present invention, the plane of the broken away section at the left being that of the line IX—IX of Fig. 11.
Fig. 10 is an enlarged fragmental view in vertical section of the machine of Fig. 9, the plane of the section being that of the line X—X of Fig. 11.
Figs. 13 and 14 are broken sectional views similar to Fig. 10, showing modified details of construction.
Fig. 15 is a fragmental sectional view similar to Fig. 11, showing a modified form of a detail.

In Figs. 9 to 12, modified forms of several features of the apparatus heretofore described are shown. The cradle or shell surrounding the field yoke of the machine and comprising the two sections 25a, 25b is secured in position about the yoke in the manner heretofore described. The cradle sections are provided with seating rib sections or projections 26c adjacent the line of division between the section and at spaced intermediate points, these rib sections being machined at their inner periphery and bearing on the outer periphery of the yoke 15. As indicated in Figs. 9 and 10, the field yoke is divided along a horizontal diameter of the machine, and the surrounding cradle 25 is divided along a diameter at an angle to the line of division between the sections of the field yoke. These seating projections or ribs 26c at the inner periphery of the cradle may be in the form of longitudinally spaced rib sections or bearing pads of only such total number and combined length as will afford suitable support for the field yoke within the assembled shell or cradle. Where the length of the machine is not too great, these bearing or supporting rib sections will be positioned only at points adjacent the ends of the field yoke, a short rib section adjacent one end of the cradle bearing on one end of the yoke 15, as indicated at 26c of Fig. 11, and a corresponding short rib section, in axial alinement with each rib section, indicated at 26c, bearing on an axially opposite end portion of the yoke 15. And strengthening rib portions 91, of reduced thickness, and formed integral with the seating rib sections and the adjacent portions of the annular body and the end of the shell, may be provided.

Intermediate the circumferentially spaced seating sections 26c, a multiplicity of thin longitudinally extending radial cooling ribs or fins 92 are provided on the inner periphery of the shell sections, these ribs being of relatively good heat conducting character, preferably of sheet copper, and relatively closely spaced, and affording maximum advantage in the matter of exposed surfaces in contact with the heated air circulated between the exterior of the yoke and the interior of the shell, and without undue obstruction to the ready passage of the circulating air, during operation of the machine. These ribs or fins are preferably in the form of strips of sheet metal of angular cross section projecting into close proximity to the field yoke and slightly spaced therefrom, and have their bases secured, by welding, soldering or the like, to the inner surfaces of the body portion of the shell sections, as indicated at 93. The arrangement is such that heated air from the enclosed machine is forced by the fan 51, at one end of the machine, into the space between the yoke and supporting cradle wherein heat is absorbed from such circulating air by the cooling ribs or fins 92 and the body of the cradle. Due to the fact that the supporting rib sections 26c at each end of the machine are relatively few and widely spaced from one another, the entrance of air into this space and its passage therethrough and discharge therefrom are quite free and open.

Figs. 13 and 14 show modified forms of heat absorbing ribs or fins. In Fig. 13, the heat absorbing fins 94 are in the form of corrugated strips or sheets of metal with the tips of the corrugations, at least those adjacent the inner periphery of the body portion of the shell sections, bent into right angular form to provide base portions 95 which are secured, as by spot welding, in intimate heat transferring relation to the shell sections, as indicated at 95; and the opposite portions of the corrugated cooling fin structure projecting into close proximity to the exterior of the field yoke. In Fig. 14, the heat absorbing ribs or fins 96 are in the form of a plurality of channel-shaped sections of thin sheet metal, with the base portions 97 of adjacent channel sections abutting and secured, as by welding or the like, to the inner periphery of the body portion of the shell sections; and the inwardly projecting legs of each channel section are laterally offset toward each other to provide, in the assembled cooling fin arrangement, a series of substantially equally spaced radially extending fins projecting into relatively close proximity to the field yoke.

Figure 2:
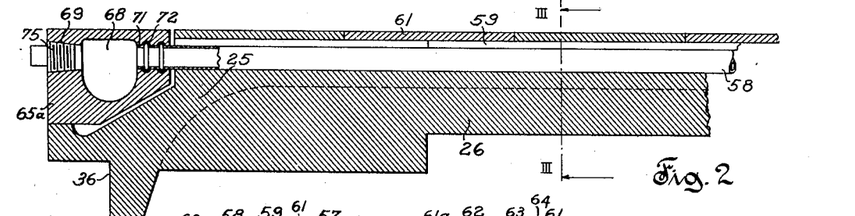
Fig. 2 is an enlarged fragmental view in vertical section of a detail of the machine shown in Fig. 1, the plane of section being that of line II—II of Fig. 5.
Figures 11, 12:
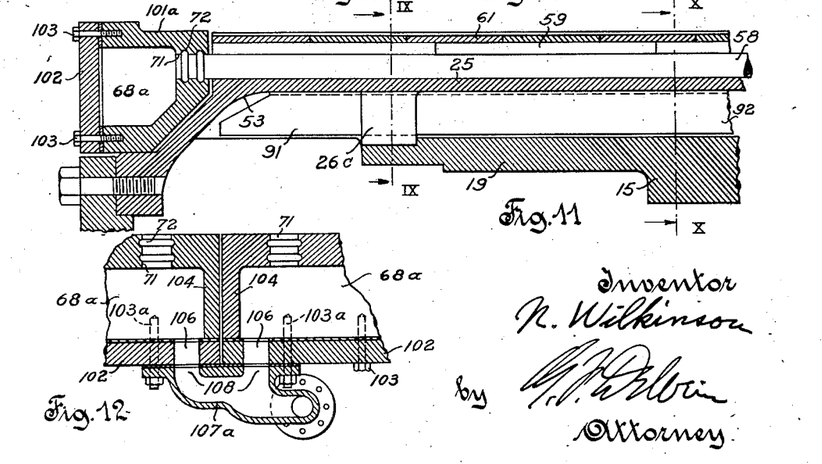
Fig. 11 is an enlarged sectional view in the plane of the line XI—XI of Fig. 10.
Fig. 12 is an enlarged sectional view in the plane of the line XII—XII of Fig. 9.

The header of the cooling conduit system at each end of the cradle is made up of four similar header sections 101a, 101b, 101c, 101d, in substantially abutting relation; and these header sections, instead of being provided with apertures in an integral outer wall, opposite the cooling tubes 58, as indicated in Figs. 1 and 2, are of the form indicated in Figs. 9, 11 and 12, wherein each header section in the form of an arc-shaped channel, open at its axially outer side, is provided with an arc-shaped closure plate 102 removably secured by bolts 103 in operative sealing arrangement with the open sides of the channel-shaped body of the header section. The axially inner wall of each header section is provided with apertures 71 in which the cooling tubes 58 may be secured in fluid tight relation, in the manner hereinabove described in connection with Figs. 1 to 5.

The fluid passage 68a, formed in each header section when the closure plate 102 is secured in position, is closed at each end of the section by an integral end wall 104. The closure plates 102 of the pair of adjacent header sections 101a and 101b, and likewise the closure plates 102 of the pair of adjacent header sections 101c and 101d, at one end of the machine, which may be considered that end shown in elevation in Fig. 9, are each provided at their adjacent ends with through apertures or ports 106. In the interest of reducing the number of inlet and outlet connections for cooling fluid supplied to the headers, common inlet and outlet connections may be provided for pairs of adjacent header sections, as indicated in Figs. 9 and 12. Pipe connections, serving as inlet connections to or discharge connections from the header sections, depending upon the desired direction of flow of cooling fluid, are removably secured upon the portions of the closure plates 102 overlying the ports adjacent the ends of the header sections. The pipe connections 107a and 107c overlie and are connected to adjacent ends of the cover plates of header sections 101a and 101b and header sections 101c and 101d, respectively, at one end of the machine; and pipe connections 107b and 107d overlie and are connected to adjacent ends of the cover plates of header sections 101b and 101c and header sections 101d and 101a, respectively, at the opposite end of the machine. These pipe connections are provided with ports 108 in alinement with the ports 106 in the ends of the adjacent cover plates 102. Separate bolts may be used for securing the inlet-discharge connections to the cover plates 102, or as indicated in Fig. 12, common bolts 103a may be used for securing the inlet-discharge connections to the adjacent cover plates and also for securing the end portions of the latter in sealing arrangement with the body of the header sections.

With the pipe connections 107a and 107c disposed at the same end of the machines, used as inlets, cooling fluid under pressure passes through the ports 106 in the adjacent cover plates 101a, 101b on which these pipe connections are mounted, passages 68a in such header sections, and through the associated cooling tubes 58 carried by the shell, to the passageways 68a in the header sections 101a, 101b, respectively, at the opposite end of the machine, the cooling fluid discharging from these latter header sections through the ports 106 in the cover plates of the latter header sections, to the discharge connections 107d and 107b, respectively. And the cooling fluid entering the inlet 107c flows through the adjacent ports 106 and passages 68 of the header sections 101c and 101d, the tubes 58 connected thereto, and into the passages 68a of header sections 101c and 101d at the opposite end of the machine, the fluid discharging through ports 106 in the discharge connections 107b and 107d. Thus two inlet connections, disposed at one end of the machine, and two discharge connections, disposed at the other end of the machine, serve for the circulation of cooling fluid to and from the several sections of the headers at the ends of the machine.

The flow between the passages 68a of oppositely disposed header sections, one at one end and the other at the opposite end of the machine, may be in the same direction through all of the tubes 58 associated with these header sections, following the general flow arrangement indicated diagrammatically in Fig. 6; or the header sections may be provided with partitions or barriers corresponding, as indicated at 81, 81a of Figs. 5 and 7, described hereinabove, to provide for a series parallel flow through the tubes 58 between the oppositely disposed header sections, as described hereinabove.

In Fig. 15, there is shown a modified form of header section for a cooling conduit system which has certain advantages from the standpoint of economical construction. The header section, instead of being in the form of an element grooved at its axially outer side to provide the desired fluid passage therethrough and a relatively flat closure plate for the open side of said element, as indicated in Figs. 9 and 11, comprises a relatively flat arc-shaped plate 109 provided with through apertures 71 in which the ends of the tubes 58 are secured in sealing arrangement. These plates 109 are disposed in a recess, preferably of substantially right angular cross section, formed at the ends of the shell or cradle 25. On the axially outer side of this plate 109 is secured a trough-shaped housing or cover 110 having its circumferential ends closed by end plates, preferably integral with the body of the housing, the open sides and ends of the housing having flanges engaging the edges of the plate 109 and being secured thereto in sealing engagement by bolts or screws, thus providing a conduit or passage 68b between the plate 109 and the axially outer wall of the housing.

Adjacent end portions of the housing element 110 of this modified form of heater section may be provided with inlet and discharge ports, similar to 106 of Fig. 12, over which inlet and discharge connections 107a, 107b, 107c and 107d may be secured, to provide the desired flow of cooling fluid through the passages 68b of the assembled header sections and the tubes 58 associated therewith, all in a manner which will be apparent from the description hereinabove of the apparatus of Figs. 9 and 12.

Figure 16:
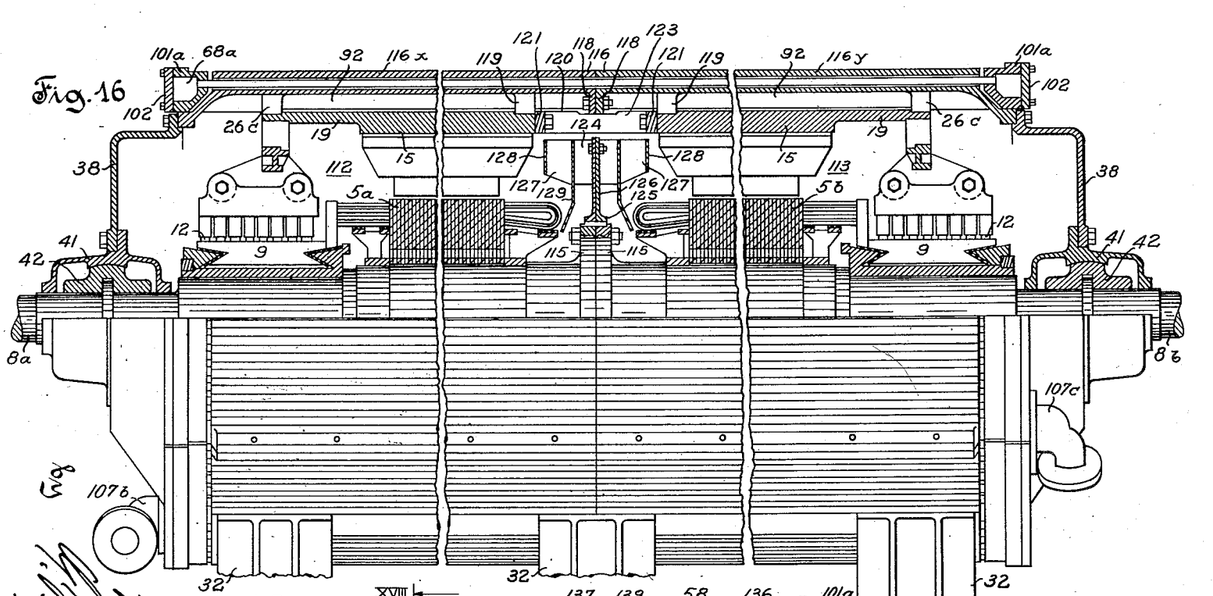
Fig. 16 is a view in elevation, with parts in section, of a machine embodying a modified form of certain features of the invention.

In Fig. 16 there is shown a double machine (D. C. motors or generators) the two machines 112, 113 being in transposed position to leave the commutators 9 at the axially outer end of the machines. The armatures 5a, 5b of the individual machines 112, 113 are provided with through axial apertures for interior ventilation, and are mounted on a single shaft, or each armature is mounted on its own shaft section 8a, 8, respectively, the shaft sections being provided with radial coupling flanges 115 which may be bolted together to secure the shaft sections in operative condition; and the assembled shaft sections are mounted in bearings 42 supported by bearing housings 41 carried by the end closures or housing 38.

The field yoke 15 of each machine is in two sections, divided and detachably secured in the same manner as the corresponding parts of the machines previously described; and the field yokes of machines 112, 113 are supported in an enclosing shell or cradle 116, the latter comprising upper and lower sections divided and secured together in a manner described hereinabove with respect to the corresponding parts of the machines of Figs. 1 and 5 or 9 and 10. While the upper and lower cradle or shell sections may each be in a single continuous piece from end to end of the combined machine assembly, it may be desirable, where a single piece supporting shell is difficult or expensive to construct, to form each cradle section of two longitudinally alined parts rigidly fastened together, to permit handling of the two parts as a unit. As indicated, the upper and lower sections of cradle 116 are each assembled from two substantially similar parts 116x, 116y, secured together by bolts passing through internal flanges 118 on the adjacent machined edges of these parts and holding the same in a mechanically secure and sealed manner, the axially alined and connected cradle parts 116x and 116y thus forming a unitary shell or cradle section for one-half of the combined machine assembly.

The field yokes 15 of the two machines 112, 113 are positioned in cradle 116 through the cooperation of an annular series of circumferentially spaced rib sections 26c, similar to the corresponding rib sections of Figs. 9 and 11, at the inner periphery of the shell sections opposite the commutator end of each machine, these rib sections engaging machined end portions of the yokes 15, with shouldered portions of the latter abutting against the corresponding rib sections 26c. Spaced rib sections 119, axially alined with the rib sections 26c, may be provided on the cradle sections in position to seat on peripheral machined portions at the inner end of each yoke, a shouldered portion on the yoke abutting against such rib sections, and the yoke of each machine being thus held in position, against axial movement, between rib sections 26c and 119.

As an alternative or auxiliary supporting and positioning feature for the axially inner ends of the field yokes with respect to the cradle sections, an annular spacing frame 120 may be provided, this frame comprising spaced circumferentially extending side elements 121 connected by circumferentially spaced cross pieces 123. This spacing and positioning frame may be in the form of two semicircular sections divided in the same plane as in the field yokes, or it may be in the form of a series of spaced frame segments. The assembled spacing frame 120 is held in position between the opposed inner ends of the field yokes by bolts or screws passing through the side elements 121 and into the ends of the field yokes. The spacing frame is of such axial dimension that when the frame is secured in operative position, the yokes are held in desired position with respect to each other, with the shouldered portions adjacent the commutator ends of the yokes abutting against the rib sections 26c. And the inner periphery of the flanges 118 may be machined to closely engage correspondingly machined surfaces on the cross pieces 123 of the spacing frame, as indicated, and thus provide an effective support for the axially inner ends of the field yokes in the cradle or shell.

With the provision of the spacing frame, holding the field yokes in position between the rib sections 26c at the outer ends of the machines, and the flanges 118 of the cradle sections seated on the spacing cross pieces 123 of the spacing frame, the rib sections 119 may merely seat on the outer periphery of the field yokes, without providing a shoulder against which a portion of the yoke abuts; or the rib sections 119 may be dispensed with entirely, and the flanges 118, seating on the cross pieces 123 of the frame 120, may be relied on as the only form of support for the axially inner portions of the field yokes of the machines.

The cradle or shell 126, made up of the alined and connected sections 126x and 126y is provided with grooves at its outer periphery containing the tubes 58 of the fluid cooling system, as shown in a conventional form herein, the grooves and the actual manner of securing the tubes therein through filler pieces and wedges being particularly described in connection with the disclosure as to Figs. 1 to 11. The ends of the tubes projecting from the cradle are secured in fluid sealing relation in the apertures 71 of the header sections 101, of the same character as disclosed in Figs. 9, 11 and 12; and the header sections are provided with fluid inlet and discharge connections, of the same character as described in connection with Figs. 9, 11 and 12, to provide for the circulation of cooling fluid through the header sections and tubes.

A ventilating fan 124 is disposed on the rotor intermediate the inner ends of the two machines. This fan includes an annular hub 125 carrying a radial support or central barrier 126, which carries a circumferential series of radial fan blades 127 at each side of the barrier. Annular guide plates or end housings 128 are provided at the axially outer ends of the fan blades. At an axially intermediate point on and connected to the fan blades at each side of the central barrier are annular baffles or barriers 129 extending from the outer periphery of the fan to a point adjacent or radially beneath the end turns of the armature winding. With the fan suitably mounted and keyed in position on the armature shaft for rotation therewith, the arrangement shown comprising the keying of the hub of the fan on the connected flanges 115 of the shaft coupling, the fan, in operation, draws heated air from the space radially within the end turns and from points opposite the air gap and the spaces between adjacent field poles, and forces such heated air radially outward through the openings in the spacing frame 120 for the field yokes, and into the spaces between the field yokes and the surrounding cradle or shell, where such air passes in contact with the cooling ribs or fins 92 on the inner periphery of the shell. This air, after being substantially cooled through its contact with the cooling ribs or fins of the shell, passes into the ends of the enclosed machine assembly, portions of the cooled air passing about the commutator and end turns of the machine, and through the spaces between adjacent field poles, the air gap and axial ventilating passages in the body of the armature; and the air absorbs heat from the machine during this passage, and is then recirculated by the fan through the path described. The heat absorbed by the ribs or fins 92 on the inner periphery of the cooling shell 116 is conducted through the metal of the shell and the cooling tubes 58, to the water or other cooling fluid which is forced through the cooling conduit system which has been described hereinabove.

In the machines hereinabove described, substantially the entire circumferential length of the shell or cradle sections may be provided with the axially extending cooling tubes 58, although it may be necessary to increase the spacing between adjacent tubes at points opposite the holes in the supporting pedestals or feet 31, 32 in order to provide sufficient metal about the alined bolt holes in the cradle. While it is not convenient to remove and replace a leaky tube located opposite a supporting pedestal, still it may be desirable to use cooling tubes in the cradle at these points, since if such a tube should leak, it is accessible, through the header section, so that it can readily be blocked off by closure plugs 75a, and can remain out of service until the machine is out of commission for a sufficient period to permit supporting the shaft by external means, and rotating the cradle about the shaft, after the pedestal bolts are removed, so as to bring the leaky tube into a position wherein it can be removed, and a substitute tube secured in position, by either of the methods described hereinabove, following which the cradle may be adjusted to normal position and mounted on its supporting pedestals. Likewise, particularly where the assembled machine is not of too great axial length, the machine may be mounted in position wholly by having the lower sections 38b of end housings provided with supporting feet, removably secured thereto or to pedestals mounted on the floor or support, thus leaving the entire periphery of the lower cradle section and associated header sections entirely free and permitting ready removal and replacement of tubes 58 through movement thereof in a direction generally radial of the machine.

Figure 17:
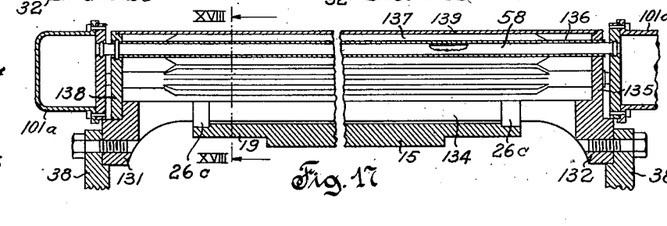
Fig. 17 is a fragmental sectional view, similar to Figs. 11 and 15, showing a modified form of embodiment of features of the invention.
Figure 18:
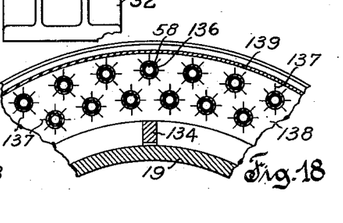
Fig. 18 is a fragmental sectional view in the plane of the line XVIII—XVIII of Fig. 17.

In Figs. 17 and 18, there is shown a further modification of enclosing cradle or shell and heat absorbing fluid conduit system therefor. The header sections may be of any of the forms heretofore described, but they are shown as being of the type illustrated in Fig. 15. The enclosing and supporting cradle or shell is preferably in the form of semicircular sections removably secured together in a manner heretofore described, and each section comprises opposed end elements 131, 132 carried by the supporting end housings 38. Circumferentially spaced strengthening or supporting ribs 134, integrally uniting the opposed end elements 131, 132 at the circumferential edges thereof and at spaced intermediate points, may be provided. At a point adjacent the end portions 19 of the field yoke, these ribs 134 are provided with enlarged bearing or seating portions 26c machined at their radially inner sides to closely engage shouldered recessed portions at the outer periphery of the end portions 19 of the yoke.

The end element 132 has a radial flange 135, the latter being provided with spaced through apertures in which are secured the ends of relatively rigid tubes 136 of material of relatively high heat conducting character. These tubes are provided with a number of radially extending heat conductive fins 137, secured by welding or brazing to the exterior of the tubes, and the inner wall of each tube is provided with a shallow slot extending from one end to the other end of the tube. The other ends of the tubes 136 are secured in through openings in a semi-annular plate 138 formed separate from, but securely mounted on the end element 131 to constitute a flange portion thereof and a unitary part of the cradle assembly. Tubes 58, relatively thin and of good heat conducting characteristics, are disposed within the through recesses or bores of the supporting tubes 136 and pressed or expanded into intimate engagement with the latter tubes throughout. The ends of the tubes 58 extend beyond the flanges 135 and 138 and pass through alined openings in the axially inner wall of the header sections, indicated at 101a, the latter being of the type shown in Fig. 15 and being provided with suitable inlet and discharge connections for the cooling fluid, as described hereinabove.

A cover plate 139, of suitable strength and rigidity, is secured in position to, and in sealing arrangement with, the radially outer edge of the end flanges 135 and 138 throughout the full circumferential length of the latter, the cover plate preferably seating against shoulders of recessed portions at the outer periphery of these flanges. The two semicircular cradle sections may be secured together by bolts passed through radially projecting and longitudinally extending flanges on the cover plate sections or on those ribs 134 which are disposed at the circumferential edges of the sections, as generally indicated in Figs. 5, 9 and 10. The supporting feet or pedestals 31, 32, indicated in Fig. 1, are so disposed with respect to certain of the ribs 134 of the lower cradle section that the pedestal bolts, after passing through the cover plate 139, may be threaded into apertures in such ribs, preferably in enlarged portions thereof.

In assembling the sections of the cradle 116, one end of the tubes 136, the walls of the latter tubes being of appreciably greater thickness than the walls of the tubes 58 of the fluid conduit system, is united to the flange 135 in a mechanically secure and sealed manner, as by welding or rolling. The flange plate 138 is then drawn over the opposite ends of the tubes 136, with these ends passing through the suitable spaced openings therein and suitably secured in such openings, as by rolling or welding. The radially inner portion of the flange plate 135 is then firmly united to the adjacent shoulder portion of the end element 131. The inner diameter of the heavier tubes 136 is just sufficiently large to permit sliding the fluid conducting tubes 58 through the first tubes to a position wherein the ends of the tubes 58 project beyond the tubes 136. The portion of the tubes 58 lying within the tubes 136 are preferably expanded or rolled into intimate heat-transferring engagement with the inner walls of the tubes 136. The manner of securing the exposed ends of the tubes 58 in the adjacent wall of the header will be apparent from the description hereinbefore.

Heated air from the enclosed machine is forced by the ventilating fan into one end of the space within the enclosing cradle and passes longitudinally through such space in intimate contact with the tubes 136 and their heat absorbing fins 137, and such air is discharged from the opposite end of the enclosing cradle to the enclosed space at the other end of the machine. During passage of this heated air in contact with the tubes 136, and more particularly the cooling fins thereof, heat absorbed by such fins and tubes is conducted to the cooling tubes 58 from which it is absorbed by the cooling fluids circulating therethrough and through the associated header sections.

It will be apparent that if a leak should develop in any cooling tube 58, such leakage will be confined to the space within the tube 136, and passing through the hereinabove described longitudinal slot in the inner wall of the latter tube, will eventually manifest itself at one or the other open end of the tube 136, in the space between the flange 135 or 138 and the adjacent end of the cradle or shell. And in any event, there is no possibility of this leakage passing to the interior of the enclosed machine, since this relatively thick outer supporting tube 136 is not subjected to any appreciable extent to any corrosive or other deteriorating effects.

In replacing a leaky tube 58 of this machine, the end closure of the header section is removed and then the defective tube is cut by a cutting tool placed within the tube and helically advancing within the latter to make a helical cut through the wall of such tube, after which the end tube may be withdrawn, as a helical ribbon, from the outer tube 136. A replacement tube may then be inserted to position within the outer tube and expanded into intimate engagement with the inner wall hereof, and the projecting ends of the tube 58 may be suitably secured to the axially inner wall of each header section.

In order to minimize the absorption of heat by the cover plate 139 and its dissipation to the surrounding atmosphere, this cover plate may be of poor heat conducting characteristics, or its inner surface, or both inner and outer surfaces thereof, may be provided with a covering of heating insulating material.

In order to clean the cooling tubes 58 at any time, the removable plugs 75 for the openings 69 of the header sections of Figs. 1 to 5, or the removable end cover plates of the header sections of the machines of Figs. 9, 10, 11, 15, 16 and 17, may be removed, and a scraping plug or brush then inserted in the respective tubes 58 and forced therethrough to effect the desired cleaning thereof.

In case it is desirable to inspect or make repairs on interior parts of the machine, the upper section 38a of one or both end housings may be removed, after disconnecting any current leads and other attachments passing through this section of the end housing and removal of the bolts which attach such section to the upper cradle section, to the flange 46 on the bearing housing and to the lower section of the end housing. If it is desired to work upon parts of the field yoke element 15b normally inside the lower section of the cradle, the locking key 25c, which holds the field yoke in normal position relative to the cradle element, is removed and, if necessary, the bolts, which hold together the securing flanges of the two sections of the cradle element, are slackened; and the field yoke, while supported on the lower section of its supporting cradle, may be rotated, as through a suitable mechanical device cooperative with projections or slots formed on the field yoke, to any desired position to permit inspection and work on any part of the field member. After inspection or operations are completed, the field member may be rotated to normal position relative to the cradle, wherein it is definitely secured by insertion of the locking key, and the end housing section or sections may be assembled in obvious manner to place the machine in operative condition. It will also be apparent that the upper cradle section and the upper end housing section, the latter along with or separately from the cradle section, may be wholly removed from the lower cradle section; and, if desired, the upper section of the field yoke may be bodily removed from the lower section thereof, after removal of the bolts which secure the two yoke sections together. With the parts disassembled to this extent and the upper sections of the bearings removed, the armature of the machine may be bodily removed.

Through the provision of a fluid-cooled machine of the character described, wherein the machine proper and the cooler constitute a self-contained unit, it will be apparent that highly effective cooling of the machine may be secured with a minimum of space-occupying requirements and power consuming accessories, and that the machine proper is thoroughly sealed in a fluid tight manner, and further that the arrangement of parts readily permits assembling of the machine and disassembling thereof to any desired degree, as for inspection and repairs, even when the machine is located in crowded quarters. And with the machine proper disposed in a sealed chamber as described, condensation of moisture within the machine casing, such as occurs when the machine parts are cooled by air supplied from without the machine, and deleterious results of rust and scale formation from such moisture in the machine are avoided. With the cooling fluid passed through tubes, which while arranged to absorb heat produced in the machine, nevertheless are separated from the machine proper by a fluid impervious barrier, any leakage from such tubes cannot result in passage of the cooling fluid to the interior of, and consequent damage to, the machine. And by the use of a considerable number of individual tubes of relatively small cross sectional area and reduced wall thickness, as permitted by reason of the full support of the tubes throughout their length by the cradle or shell, as distinguished from individual water jackets or cooling compartments of extended area, most effective results are attained in absorbing and dissipating heat generated in the machine; and it is possible to dissipate the heat of the machine without appreciably increasing the temperature of the atmosphere in which the machine assembly is located.

With the cooling system independent of or separate from the material of the machine proper, materials may be used in the cooling system which best facilitate the objects to be attained, from the standpoint of heat absorption, weight, space-occupying requirements and resistance to deterioration from the action of the cooling fluid which may be quite harmful, particularly in the case salt water is used as a cooling fluid; and likewise, through this separation of the cooling conduit system from the machine proper, it is possible to make necessary repairs on the fluid cooling system with great facility and usually without withdrawing the machine from service.

While major advantages of the present invention are attainable in connection with enclosed dynamo-electric machines, it will be apparent that various features of this invention are advantageous in connection with other apparatus.

It should be understood that the present invention claimed is not limited to the particular details of construction and design illustrated and described herein, and that such invention includes all modifications within the scope of the appended claims.

It is claimed and desired to secure by Letters Patent:

1. In combination, a dynamo-electric machine having a stator and a rotor, a separately formed cooling element disposed radially outside of said stator and having portions thereof in position to absorb heat generated during operation of said machine, a conduit system carried by said cooling element, and including a plurality of spaced heat conductive tubes adapted to carry cooling fluid therethrough and embedded within and in intimate heat absorbing engagement with the material of said cooling element over at least one-third of the surface area of the tubes and throughout substantially the full axial length of said cooling element, one of said parts being provided with a longitudinally extending recess between portions of said parts in intimate heat transfer engagement, said recess extending from an interior portion of said cooling element to the axial end thereof and providing a passage through which leakage from said tube may pass to a point of discharge outside of said cooling element.

2. In combination, a dynamo-electric machine having a stator and a rotor, a separately formed cooling element disposed radially outside of said stator and having portions thereof in position to absorb heat generated during operation of said machine, a conduit system carried by said cooling element, and including a plurality of spaced heat conductive tubes adapted to carry cooling fluid therethrough and embedded within and in intimate heat absorbing engagement with the material of said cooling element throughout the major portion of the axial length thereof and at least one-third of the surface area of the tubes, and a header disposed at each end of said cooling element, the ends of said tubes being connected in fluid communication with said headers, and the material surrounding each tube being provided with a longitudinal recess through which leakage from said tube may pass to a point of discharge at the axial end of said cooling element and axially within the adjacent header.

3. In combination, a dynamo-electric machine, comprising a stator and a rotor, and an enclosure for said machine comprising an annular cooling shell surrounding said stator, said shell having slots of extended length along its outer periphery and being provided with a cooling conduit system comprising a plurality of fluid carrying tubes disposed in the peripheral slots of said shell, and means for securing said conduits in said slots in intimate heat-transferring relation to the material of said shell, said means comprising a filler element of material of good heat conductivity having extended engagement with said tube.

4. In combination, a dynamo-electric machine comprising a stator and a rotor, a cooling shell separable from and surrounding said stator and provided with slots of extended length along its outer periphery, said shell having its active portions of good heat conductive material, a plurality of spaced tubes disposed within the peripheral slots of said shell in intimate heat-transferring relation to the material of said shell, a header connected to and communicating with said tubes at an end of said shell and serving as a part of a conduit system for circulating cooling fluid through said tubes, means for securing said tubes in intimate heat-transferring relation to the material of said shell, said means comprising a filler element engaging the tube along an extended curved engaging surface, and provided with a longitudinal slot adjacent said tube adapted to collect and convey leakage from said tube longitudinally through said slot.

5. In combination, an enclosed dynamo-electric machine, comprising a stator and a rotor, a cooling shell separate from and surrounding said stator, one of said parts being provided with spaced projections in engagement with the other part to provide a longitudinal passage across the radially outer surface of said stator and open at its ends to the spaces at the ends of said stator and rotor, means for drawing heated air or the like from the machine and circulating it through said passage in contact with portions of said cooling shell, and a cooling conduit system comprising a plurality of separately formed heat conductive tubes adapted to carry a cooling fluid, said tubes being carried by said cooling shell within the radial confines thereof and in intimate heat absorbing relation to the material thereof over an extended surface area of the tubes throughout the major portion of the length thereof, the ends of said tubes extending beyond said cooling shell and emerging therefrom at points outside of the machine enclosure.

6. In combination, an enclosed dynamo-electric machine, comprising a stator and a rotor, a cooling shell separate from and surrounding said stator, one of said parts being provided with spaced projections in engagement with the other part to provide a longitudinal passage across the radially outer surface of said stator and open at its ends to the spaces at the ends of said stator and rotor, additional heat absorbing ribs projecting from the body of said shell into said passage, means for drawing heated air or the like from the machine and circulating it through said passage in contact with said ribs and portions of said cooling shell, a cooling conduit system comprising a plurality of heat conductive tubes separate from said cooling shell and adapted to carry a cooling fluid, said tubes being carried by said cooling shell radially within the outer periphery thereof and in intimate heat absorbing relation to the material of said shell over an extended surface area of said tubes throughout the major portion of the axial length of said shell, the ends of said tubes projecting axially beyond the ends of said shell, and a header formed separately from and disposed at an end of said shell and connected in fluid communication with said tubes, said header being spaced from the end of said shell at the points of emergence of said tubes from said shell.

7. In combination, a dynamo-electric machine, comprising a stator and a rotor, an annular cooling shell in a plurality of separable sections surrounding said stator, and end closure heads serving with said shell to complete the enclosure of said machine, circumferentially extending cooperative seats on said stator and one of said shell sections and through which said stator is supported in said shell section, and means for releasably securing said stator in fixed supported position in said shell section, said stator being rotatable on its supporting seat in said shell section on release of said securing means.

8. A wholly enclosed dynamo-electric machine, comprising a stator and a rotor, a separate cooling shell surrounding said stator and having portions at its radially inner side in supporting engagement with said stator and providing a longitudinally extending ventilating space between portions of said shell and the outer periphery of said stator and opening into the spaces at the ends of the machine, means for producing a closed circulation of air or the like within the enclosed machine and through the ventilating space between said stator and said portions of the shell, a cooling conduit system comprising a plurality of separately formed, longitudinally extending heat conductive tubes embedded in the material of said shell in intimate heat transfer engagement therewith throughout substantially the full axial length of said shell and projecting beyond the ends of said shell at points outside of the machine enclosure, and means connected to said tubes at points spaced from said shell for producing a flow of cooling fluid through said tubes.

9. A wholly enclosed dynamo-electric machine, comprising a stator and a rotor, a separate cooling shell surrounding said stator and having circumferentially spaced portions at its radially inner side in supporting engagement with said stator and providing a longitudinally extending ventilating space between portions of said shell and the outer periphery of said stator and opening into the spaces at the ends of the machine, means for producing a closed circulation of air or the like within the machine and through the ventilating space between said stator and said shell, a cooling conduit system comprising a plurality of longitudinally extending heat conductive tubes adapted to carry a cooling fluid and formed separately of said shell and removably embedded in heat absorbing relation in the material of said shell and extending beyond the ends thereof, and a header formed separately from and disposed at each end of the shell in spaced relation thereto at points about said tubes where the latter emerge from said shell, the ends of said tubes being connected in fluid communication with said headers.

10. In combination, a dynamo-electric machine, comprising a stator and a rotor, and an enclosing housing for said machine comprising an annular cooling shell in a plurality of separable arc-shaped sections surrounding said stator, each of said sections having its individual cooling conduit system comprising a plurality of fluid carrying tubes disposed in slots at the outer periphery of said section, and means for removably securing said conduits in said slots in intimate heat-transferring relation to the material of said section, said tubes being removable from said slots in a direction transverse to the axis of said machine.

11. In combination, a plurality of dynamo-electric machines mounted in axial alinement in spaced relation and each comprising a stator and a rotor, a cooling shell surrounding the stators of said machines, said shell and said stators being in supporting relation one with respect to the other with the body portion of said cooling shell spaced from said stators to provide ventilating passages extending from one end to the other of said stators, and a cooling conduit system comprising axially extending tubes embedded in the material of and in intimate heat-transferring relation to the material of said shell, means for drawing heated air or the like from each of said machines and circulating the same through the ventilating passage between the stator and the adjacent portions of said shell, and means providing for circulation of cooling fluid through said tubes.

12. In combination, a plurality of dynamo-electric machines mounted in axial alinement and in spaced relation and each comprising a stator and a rotor, an enclosing cradle surrounding and forming a support for said stators, end heads carried by said cradle and completing the enclosure of the assembled machines, said end heads carrying bearings in which the shaft of said machines is mounted, the body portion of said cradle being spaced from said stators to provide ventilating passages extending from one end to the other of said stators and communicating with the enclosed spaces axially inside said end heads, a cooling conduit system comprising axially extending tubes embedded in the material of and in intimate heat-transferring relation to the material of said cradle, means for drawing heated air or the like from said machines into the space between said machines and circulating such air through the spaces between said stators and said cradle, and means providing for circulation of cooling fluid through said tubes.

13. In combination, a plurality of dynamo-electric machines mounted in axial alinement and each comprising a stator and a rotor, a cradle surrounding and forming a support for said stators with the body portion of said cradle spaced from said stators to provide ventilating passages extending from one end to the other of said stators, means for circulating heated air from said machines through the spaces between said stators and said cradle, a cooling conduit system comprising axially extending tubes removably embedded in the material of said cradle in intimate heat-transferring relation therewith and extending throughout the length of both machines and beyond the ends thereof, headers at opposite ends of said cradle and to which the extending ends of said tubes are connected in fluid communication, and means for circulating cooling fluid through said headers and the tubes connected thereto.

14. A cooling device for dynamo-electric machines for removing heat generated during operation thereof, comprising a body portion, a plurality of separately formed tubes embedded in open slots in said body portion in intimate heat-transferring relation therewith over an extended surface area and throughout the full length of the embedded portions of the tubes and projecting beyond the ends of the body portion, means for removably securing said tubes in said slots and permitting removal of said tubes in a direction transverse to the axis of the tubes, said means comprising filler elements having extended surface engagement with said tubes over extended curved surfaces, and means providing for circulation of cooling fluid through said tubes.

15. A cooling device for dynamo-electric machines for removing heat generated during operation thereof, comprising a plurality of arc shaped elements adapted to be associated with and absorb heat from said dynamo-electric machine, a plurality of separately formed tubes embedded in each of said arc shaped elements and secured in intimate heat-transferring relation with the material thereof over an extended surface area and throughout the full length of the embedded portions of the tubes and projecting beyond an end thereof, a header section beyond and spaced from an end of each of said arc shaped elements, the projecting ends of said tubes being secured in sealing communication with said header through a wall thereof.

16. In combination, an enclosed dynamo-electric machine, comprising a stator and a rotor, and a separately formed annular cooling shell in a plurality of separable arc-shaped sections surrounding said stator and forming a part of the machine enclosure, each of said sections having its individual cooling system comprising a plurality of separately formed axially extending fluid carrying tubes of good heat conductive material embedded in the material of said section in intimate heat transferring engagement therewith over an extended surface area of said tubes and throughout substantially the full axial length of said shell, the ends of said tubes projecting beyond said shell, and a header in which the ends of said tubes are connected at points spaced from said shell.

17. In combination in an enclosed dynamo-electric machine, a stator and a rotor, and a cooling device for removing heat generated during operation of said machine, said cooling device including a heat conductive element provided with a longitudinally extending recess and disposed in the path of heated air within the machine enclosure, the walls of said recess being impervious to passage of fluid therethrough to the interior of the machine, and a separately formed cooling tube of good heat conductive material embedded in said recess in intimate heat transfer engagement with the walls thereof over an extended surface area of said walls and having an end projecting beyond the end of said heat conductive element to a point outside of the machine enclosure, the engagement surface portion of said tube or the wall of its recess being provided with a groove for passage of fluid leaking from said tube to a point outside of the machine enclosure.

18. In combination, in an enclosed dynamo-electric machine, a stator and a rotor, and a cooling device associated with said stator for removing heat generated during operation of the machine, portions of said cooling device being spaced from the adjacent portion of the stator to provide a longitudinally extending channel between said stator and said cooling device and open at its ends to the end spaces within the machine enclosure to provide for circulation of heated air between said stator and said cooling device, said cooling device including a plurality of longitudinally recessed heat conductive portions impervious to passage of fluid therethrough to the space within the machine enclosure and disposed in the path of the heated air within such enclosure, and a separately formed tube of good heat conductive material embedded in each of said recesses in intimate heat transfer engagement with the walls thereof over an extended surface area and having their ends projecting beyond said recessed portions to a point outside of the machine enclosure, and headers connected to the projecting ends of said tubes outside of the machine enclosure and at points slightly removed from said recessed heat conductive portions.

19. In combination, an enclosed dynamo-electric machine comprising a stator and a rotor, a separately formed cooling device disposed radially outside of said stator, one of said parts having formed therein a longitudinal channel extending across the radially outer surface of the stator and open at its ends to the spaces at the ends of said machine within the machine enclosure, said cooling device having heat absorbing portions in the path of heated air passing through said channel during operation of said machine and being provided with through recesses therein opening to points outside of the machine enclosure, and the walls of said recesses sealing against communication between the interior of said recesses and the enclosed air space of the machine, and a plurality of separately formed heat conductive tubes adapted to contain a circulating cooling fluid and embedded within and in intimate heat absorbing engagement with the walls of said recesses throughout substantially the full length of said recesses and the major portion of the surface area of the embedded portions of said tubes, said tubes emerging from said recesses at points at the exterior of the machine enclosure.

20. In combination, an enclosed dynamo-electric machine comprising a stator and a rotor, a separately formed cooling device disposed radially outside of said stator, one of said parts having formed therein a longitudinal channel extending across the radially outer surface of the stator and open at its ends to the spaces at the ends of said machine within the machine enclosure, said cooling device having heat absorbing portions in the path of heated air passing through said channel during operation of said machine and being provided with through recesses therein opening to points outside of the machine enclosure, and the walls of said recesses sealing against communication between the interior of said recesses and the enclosed air space of the machine, a plurality of separately formed heat conductive tubes adapted to contain a circulating cooling fluid and embedded within and in intimate heat absorbing engagement with the walls of said recesses throughout substantially the full length of said recesses and the major portion of the surface area of the embedded portions of said tubes, said tubes emerging from said recesses at points at the exterior of the machine enclosure, and a header formed separately from the body portion of said cooling device and disposed at each end thereof outside of the machine enclosure, the ends of said tubes being connected in fluid communication with said headers at points spaced from the adjacent portions of said cooling element, and the axially outer side of each header including means removable from operative position to permit access to the interior of the adjacent end of said tubes.

21. A cooling device adapted for utilization in connection with dynamo-electric machines for removing heat from circulating ventilating fluid therein, comprising a cooling element of heat conductive material provided with a longitudinally extending recess and adapted to be disposed in the path of circulating ventilating fluid in the machine, and a separately formed cooling tube of good heat conductive material embedded in said recess in intimate heat transfer engagement with the walls thereof over an extended surface area of said walls and having an end projecting beyond the end of said heat conductive cooling element to a point outside thereof, the walls of said recess being impervious to passage of leakage fluid from said tube to the space occupied by said heated circulating fluid, and the engagement surface portion of said tube or the wall of its recess being provided with a groove for passage of fluid leaking from the portion of said tube embedded in said cooling element to a point outside of said cooling element.

22. A cooling device adapted for utilization in connection with dynamo-electric machines for removing heat from a circulating ventilating fluid therein, comprising a cooling element of heat conductive material provided with a plurality of longitudinally extending recesses and adapted to be disposed in the path of said heated ventilating fluid in the machine, separately formed cooling tubes of good heat conductive material embedded in said recesses in intimate heat transfer engagement with the walls thereof over an extended surface area of said walls, with the ends of said tubes projecting beyond the ends of said heat conducting cooling element to a point outside thereof, the walls of said recesses being impervious to passage of leakage fluid from said tubes to the space occupied by said heated ventilating fluid, and the engagement surface portion of each tube or the wall of its recess being provided with a groove for passage of leakage fluid from the portion of said tube embedded in said cooling element to a point outside thereof, and fluid inlet and outlet header elements separate from said cooling element and disposed at the end thereof, the projecting ends of said tubes being secured in sealing communication with said header elements at points spaced from the adjacent portion of said cooling elements to permit leakage fluid passing along said groove to discharge outwardly from said cooling device.

23. In combination with a dynamo-electric machine of the enclosed ventilated type and comprising a rotor, and a stator having a core and winding therefor, a cooling device associated with the stator of said machine for removing heat generated in the operation of the machine, said cooling device comprising a heat conductive and absorbing element disposed in position to absorb from circulating ventilating fluid within the machine enclosure heat generated in the operation of said machine, said heat conductive element being provided with a recess of extended length opening at the end thereof to the exterior of the machine enclosure; a separately formed tubular element of heat conductive material removed from contact with said stator core and winding and the ventilating fluid within the machine enclosure and being embedded within said recess and wholly surrounded by and in intimate heat transferring contact with the material of said heat absorbing element throughout the major portion of the surface area and length of said tubular element while affording a path of restricted width and cross-sectional area between adjacent portions of said tubular element and the wall of said recess and extending from the interior embedded portion of said tubular element to the open end of said recess to provide for passage of any leakage cooling fluid from said tubular element to a point outside of the machine enclosure during normal operation of the machine, said tubular element having end portions thereof emerging from said recess in said heat absorbing element at points external of the machine enclosure, and inlet and outlet connections for supplying cooling fluid to said extending end portions of said tubular element.

24. In combination, an enclosed dynamo-electric machine comprising a stator and a rotor, a cooling shell separable from and surrounding said stator and having active portions of good heat conductive material radially spaced from said stator and in position to absorb heat generated during operation of the machine, said active portions of said shell being provided with recesses extending longitudinally throughout the axial length of said shell and with the material of said shell fully separating said recesses from the core of said stator and the ventilating air space within the machine enclosure and being impervious to the passage of leakage fluid to said air space, a plurality of substantially axially extending tubes of good heat conductive material embedded in said recesses of said shell within the radial confines thereof and projecting beyond the ends of said shell, said tubes being formed separately from said shell and held embedded therein in intimate heat transfer engagement with the material of the shell throughout substantially the full length thereof and the full surface area of the embedded portion of said tubes, and a header disposed at an end of said shell and connected to and communicating in fluid-sealed manner with said tubes at points spaced from the adjacent portions of said shell, said header having removable closure means at its axially outer end opposite said tubes and through which access may be had to said tubes.

NATHAN WILKINSON.